(12) United States Patent
Meringer

(10) Patent No.: US 10,533,717 B2
(45) Date of Patent: Jan. 14, 2020

(54) SOLAR ENERGY SYSTEMS

(71) Applicant: James A. Meringer, Phoenix, AZ (US)

(72) Inventor: James A. Meringer, Phoenix, AZ (US)

( * ) Notice: Subject to any disclaimer, the term of this patent is extended or adjusted under 35 U.S.C. 154(b) by 120 days.

(21) Appl. No.: 15/294,742

(22) Filed: Oct. 16, 2016

(65) Prior Publication Data

US 2017/0028863 A1 Feb. 2, 2017

Related U.S. Application Data

(63) Continuation-in-part of application No. 14/303,612, filed on Jun. 13, 2014, now Pat. No. 9,564,852.

(60) Provisional application No. 62/007,276, filed on Jun. 3, 2014, provisional application No. 61/987,183, filed on May 1, 2014, provisional application No. 61/934,404, filed on Jan. 31, 2014, provisional application No. 61/914,149, filed on Dec. 10, 2013.

(51) Int. Cl.
| | | |
|---|---|---|
| H02J 7/00 | (2006.01) |
| H02J 7/14 | (2006.01) |
| F21S 9/03 | (2006.01) |
| F21S 8/08 | (2006.01) |
| H02S 40/38 | (2014.01) |
| H02S 20/10 | (2014.01) |
| H02S 20/20 | (2014.01) |
| F21V 33/00 | (2006.01) |
| F24S 25/632 | (2018.01) |
| F24S 30/422 | (2018.01) |
| F24S 25/10 | (2018.01) |
| B60L 53/31 | (2019.01) |
| B60L 53/36 | (2019.01) |
| B60L 53/37 | (2019.01) |
| F21W 131/103 | (2006.01) |
| F21V 23/04 | (2006.01) |
| F24S 20/00 | (2018.01) |
| F24S 30/00 | (2018.01) |

(52) U.S. Cl.
CPC ............... *F21S 9/035* (2013.01); *B60L 53/31* (2019.02); *B60L 53/36* (2019.02); *B60L 53/37* (2019.02); *F21S 8/085* (2013.01); *F21V 33/00* (2013.01); *F24S 25/10* (2018.05); *F24S 25/632* (2018.05); *F24S 30/422* (2018.05); *H02S 20/10* (2014.12); *H02S 20/20* (2014.12); *H02S 40/38* (2014.12); *F21V 23/0442* (2013.01); *F21W 2131/103* (2013.01); *F24S 2020/16* (2018.05); *F24S 2030/16* (2018.05); *Y02B 20/72* (2013.01); *Y02E 10/47* (2013.01)

(58) Field of Classification Search
USPC ......... 320/101, 108, 109, 107; 136/243, 244
See application file for complete search history.

(56) References Cited

U.S. PATENT DOCUMENTS

| | | | | |
|---|---|---|---|---|
| 6,060,658 A | * | 5/2000 | Yoshida | .............. F21S 8/086 |
| | | | | 136/243 |
| 7,398,946 B1 | | 7/2008 | Marshall | |

(Continued)

FOREIGN PATENT DOCUMENTS

GB 2529021 2/2016

*Primary Examiner* — Alexis B Pacheco

(57) ABSTRACT

A drone landing system includes a solar collector to charge the drone at a landing cite of the drone landing system. The solar collector may include a solar collector mounting assembly, preferably comprises a bi-facial solar active component mounted with its solar active face(s) orthogonal to the ground/horizon, at or near its perimeter frame.

20 Claims, 7 Drawing Sheets

(56) References Cited

U.S. PATENT DOCUMENTS

| | | | |
|---|---|---|---|
| 7,714,536 B1 | 5/2010 | Silberg et al. | |
| 7,988,320 B2 * | 8/2011 | Brumels | F21S 8/086 |
| | | | 248/299.1 |
| 8,511,606 B1 * | 8/2013 | Lutke | B64C 39/028 |
| | | | 244/100 R |
| 9,387,928 B1 * | 7/2016 | Gentry | B64C 39/024 |
| 9,754,718 B2 * | 9/2017 | Hall | B60L 11/182 |
| 2012/0020060 A1 * | 1/2012 | Myer | F21S 2/00 |
| | | | 362/183 |
| 2014/0124621 A1 * | 5/2014 | Godzdanker | B64F 1/125 |
| | | | 244/110 E |
| 2015/0175276 A1 | 6/2015 | Koster | |
| 2015/0259078 A1 * | 9/2015 | Filipovic | H04W 88/08 |
| | | | 244/114 R |
| 2015/0336669 A1 | 11/2015 | Kantor et al. | |
| 2016/0131358 A1 * | 5/2016 | Spiro | H04W 88/08 |
| | | | 455/561 |

* cited by examiner

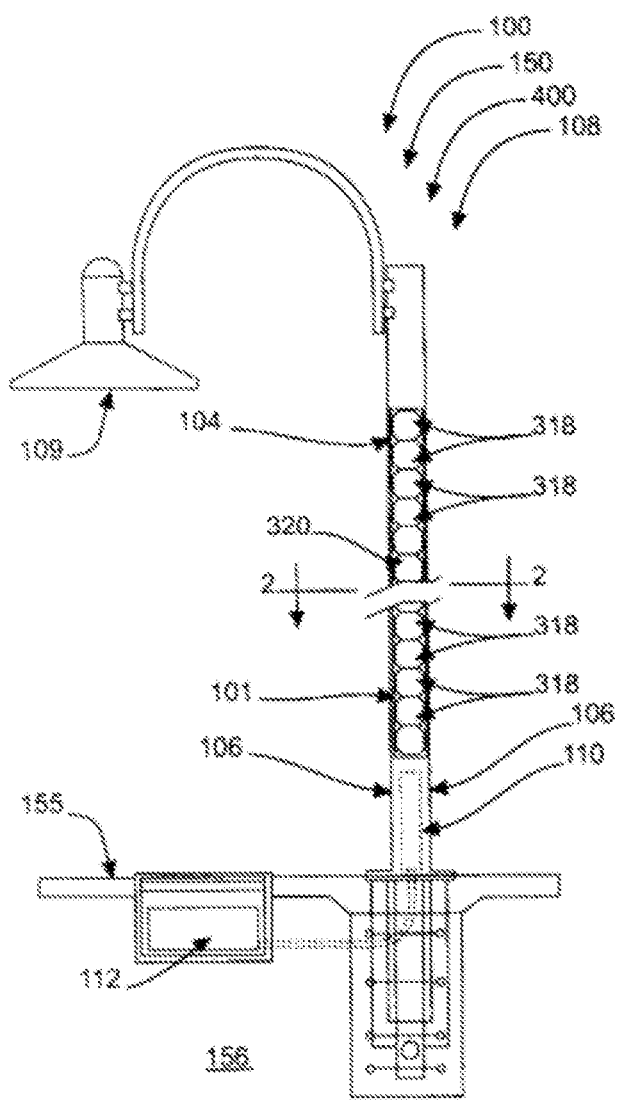
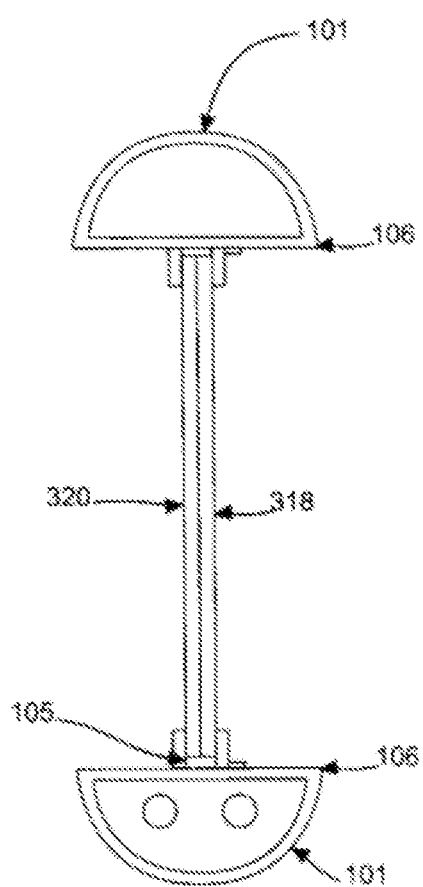
FIG. 3A
FIG. 3B

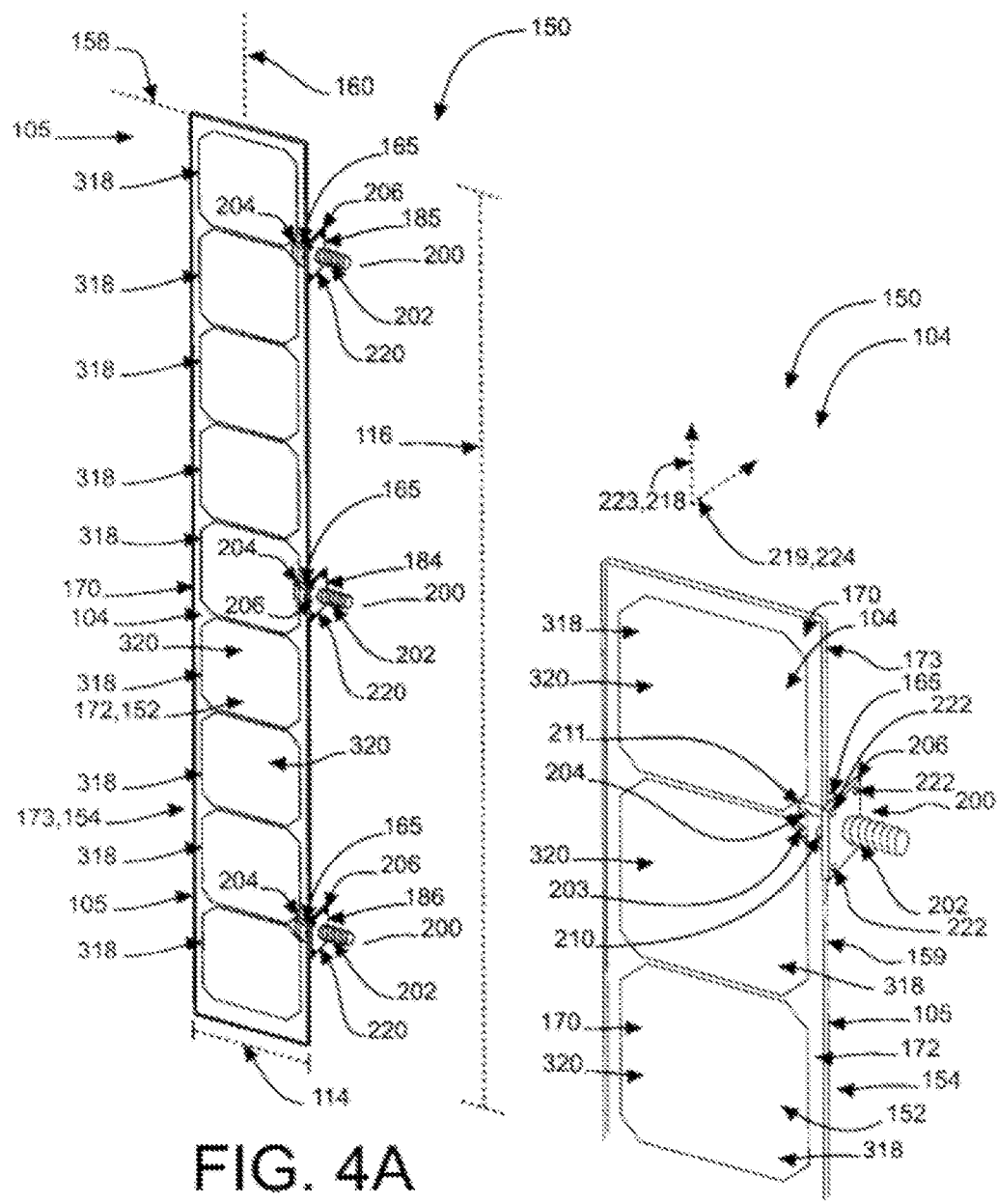

SOLAR ENERGY SYSTEMS

CROSS-REFERENCE TO RELATED APPLICATION(S)

The present application is a continuation in part of application Ser. No. 14/303,612, filed Jun. 13, 2014, which is related to and claims priority from Provisional Application Ser. No. 61/914,149 filed Dec. 10, 2013, Provisional Application Ser. No. 61/934,404 filed Jan. 31, 2014, Provisional Application Ser. No. 61/987,183, filed May 1, 2014, and Provisional Application Ser. No. 62/007,276, filed Jun. 3, 2014, the contents of all of which are incorporated herein by this reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

This invention relates to improved solar energy system including an improved solar energy collector mounting assembly. Customary solar energy systems may utilize collector panel(s) mounted prominently on a structure. Many object to the obtrusive visual appearance of such collector panels. Furthermore, during heavy wind, such large collector panel(s) may impose large and undesirable force loads on the structure(s) to which they are attached. Thus, a need exists for improved solar panel system including mounting assemblies which overcome at least the above problems.

OBJECTS AND FEATURES OF THE INVENTION

A primary object and feature of the present invention is to provide a system overcoming at least the above-mentioned problem(s).

It is a further object and feature of the present invention to provide an improved solar energy system comprising an improved panel mounting system.

It is a further object and feature of the present invention to provide such a system which maximizes exposure of the solar panel surface area, while minimizing ground area space.

It is a further object and feature of the present invention to provide a solar panel mounting assembly comprising a support structured and arranged to support at least one solar panel along the panel's edge.

It is a further object and feature of the present invention to provide such solar panel mounting assembly which provides for equal front and back sun exposure of the solar panel.

It is a further object and feature of the present invention to provide such a system implementing bi-facial (two-sided) glass substrate solar panels.

It is a further object and feature of the present invention to provide such a system utilizing solar panels mounted on at least one support post.

It is a further object and feature of the present invention to provide such a system which requires minimal support for sufficient structural stability.

It is a further object and feature of the present invention to provide such a system which is resilient to heavy winds.

It is a further object and feature to provide a solar panel support system comprising an oscillator coupling for mounting at least one solar panel.

It is a further object and feature to provide a solar panel support system comprising a hinge spring coupling between at least one solar panel and at least one support post.

It is a further object and feature of the present invention to provide such a system including a solar panel arrangement for a lighting fixture.

It is a further object and feature of the present invention to provide such a system comprising site lighting fixtures implementing an arrangement of bi-facial (two-sided) glass substrate solar panels integrated within at least one upright support post of a lighting fixture.

It is another object and feature of the present invention to provide such a system comprising a stand-alone electrical power circuit including an LED (or other) illumination source, power controller, and in-ground batteries/enclosure.

A further primary object and feature of the present invention is to provide such a system that is efficient, inexpensive, and handy. Other objects and features of this invention will become apparent with reference to the following descriptions.

BRIEF SUMMARY OF THE INVENTION

This invention relates to an improved solar energy system including an improved solar collector mounting assembly, comprising at least one solar active component ("solar fin") having at least one solar active face and a perimeter frame. The solar active component is preferably mounted via the mounting assembly on a support having a mounting surface, whereby its solar active face is orthogonal to the ground/horizon. The solar active component is further preferably mounted at or near its perimeter frame or edge, wherein its perimeter frame or edge is adjacent the support. Solar active component preferably comprises front and back solar active faces. The preferred mounting inhibits shading of the solar active component, providing maximum sun exposure on both front and back solar active faces. According to one preferred embodiment a plurality of solar active components are mounted in vertical alignment. According to certain embodiments, the mounting assembly allows the fin to oscillate with respect to a fixed mounting position in response to displacing forces, such as wind; and to situate at its fixed position absent displacing forces. The improved solar energy system includes any solar powered energy system utilizing the improved solar collector mounting assembly and/or method such as solar lighting fixtures (e.g. streetlights), solar powered traffic lights, solar car charging stations, solar powered communication equipment, solar powered billboards, solar powered surveillance systems, and solar energy collectors (e.g. for public, private, and/or residential use), etc. In further preferred embodiments, existing energy consuming fixtures, e.g. streetlights, traffic lights, utility poles, etc. can be retrofitted with a solar energy system according to the invention. In further preferred embodiments, such existing features may be retrofitted with a solar energy system adapted for utilizing both grid and solar power according to a preferred hybrid approach.

According to various embodiments, disclosed is a drone charging station comprising: a post; at least one solar collector coupled to the post; a docking station, providing a landing target for a drone, the docking station coupled to the post, wherein the at least one solar collector is configured to charge a battery of the drone through solar power collected by the at least one solar collector. In embodiments, the post further supports an illumination source. In embodiments, the drone comprises a camera system. In embodiments, the charging station comprises a controller system configured to control landing, and charging of the drone. In embodiments, the controller system comprises a processor at the post, and a remote host in communication with the processor. In embodiments, the charging station further comprises alternate power source for charging the battery of the drone. In embodiments, the drone charging station comprises a storage battery configured to store power collected by the at least one solar collector, and charge the battery of the drone at the docking station. In embodiments, the at least one solar collector has a flat planar body including i) a first planar face and a second planar face opposite the first planar face, ii) a perimeter frame surrounding the first and second planar faces, wherein the at least one solar collector is coupled to the post at a portion of the perimeter frame of the at least one solar collector. In embodiments, the docking station is above the at least one solar collector. In embodiments, the drone is used for delivery. According to further embodiments, disclosed is a drone charging station, comprising: a solar collector system comprising at least one solar panel; and a docking station providing a landing target for a drone, wherein the solar collector system provides solar power collected at the charging station to charge a battery of the drone. In embodiments, the charging station further comprises a post supporting the at least one solar panel. In embodiments, the drone comprises a camera system. In embodiments, the system further comprises a controller system configured to control landing, and charging of the drone. In embodiments, the controller system comprises a processor at the post, and a remote host in communication with the processor. In embodiments, the charging station further comprises an alternate power source for charging the battery of the drone. In embodiments, the system further comprises a storage battery configured to store power collected by the at least one solar collector, and charge the battery of the drone at the docking station. In embodiments, the at least one solar collector has a flat planar body including i) a first planar face and a second planar face opposite the first planar face, ii) a perimeter frame surrounding the first and second planar faces; wherein the at least one solar collector is coupled to a post at a portion of the perimeter frame of the at least one solar collector. In embodiments, the docking station is positioned above the at least one solar collector. In embodiments, the drone is used for delivery. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

FIG. 3A is an elevational view of an improved solar energy system comprising a lighting fixture implementing a solar energy collector mounting assembly, utilizing a double post arrangement, according to an alternate preferred embodiment of the invention.

FIG. 3B is a sectional view through section 2-2 of FIG. 3A.

FIG. 4A is a perspective view of a solar fin comprising a solar panel, further illustrating the solar panel coupled to three mounting elements in accordance with the embodiment of FIG. 1.

FIG. 4B is a partial magnified view of FIG. 4A

The various embodiments of the present invention will hereinafter be described in conjunction with the appended drawings, wherein like designations denote like elements.

DETAILED DESCRIPTION

Figure 1:
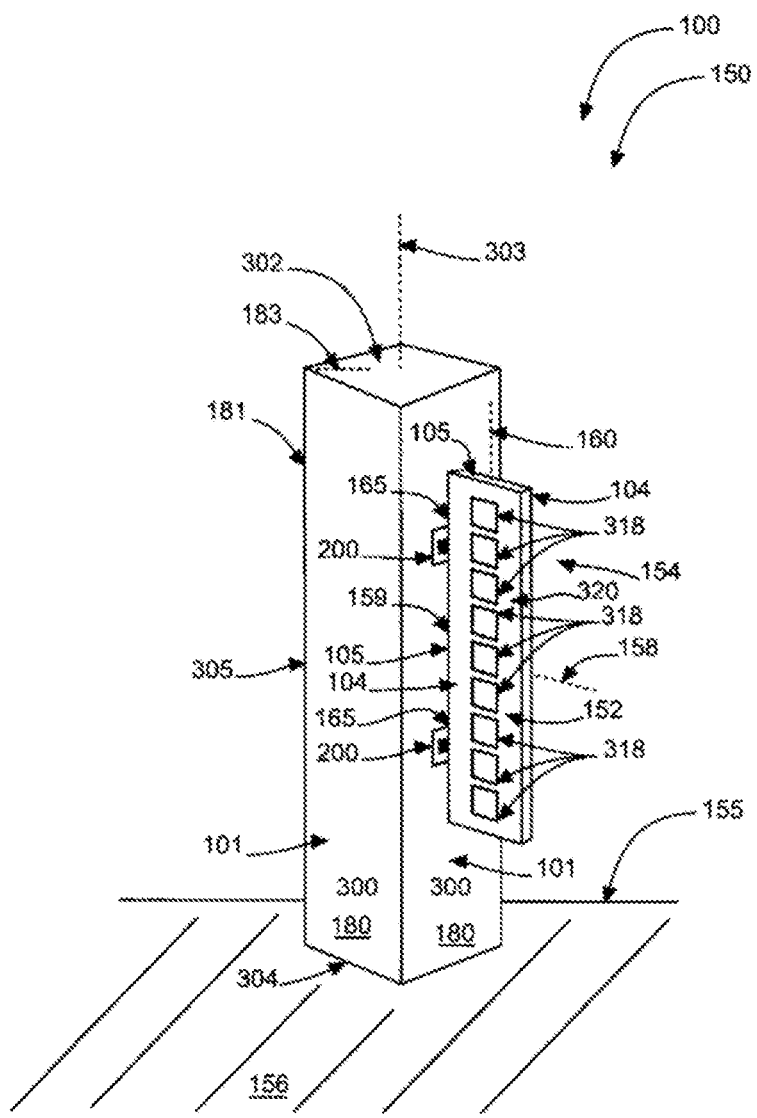
FIG. 1 shows a perspective view of an improved solar energy system utilizing a solar energy collector mounting assembly in accordance with a preferred embodiment of the invention.

Illustrated in FIGS. 1-7, and in accordance with preferred embodiments of the invention, is an improved solar energy system 100 utilizing a solar energy collector mounting assembly 150, comprising at least one solar active component having a flat planar body (exemplified by solar fin 104), inherently comprising first ("front") and second ("back") opposing faces 152, 154, respectively; first ("horizontal") and second ("vertical") planar axes 158, 160, respectively (see FIGS. 2 and 4A), which are orthogonal one another; and a perimeter frame 105 surrounding faces 152, 154. Solar fin 104 is mounted to at least one support 101 having a mounting surface 180 (see FIG. 1), with inherent vertical axis 160 of solar fin 104 preferably essentially orthogonal to the surface 155 of the ground 156 (or the horizon), and preferably with inherent horizontal axis 158 of solar fin 104 essentially orthogonal to or radially aligned with surface 180. This provides substantially equal direct sun exposure on both front and back faces of solar fin 104 throughout the daytime (assuming constant atmospheric conditions), in addition to indirect (e.g. reflected) sunlight.

Solar fin 104 is preferably mounted at or near its perimeter frame 105 to support 101, wherein its perimeter frame is adjacent to the support. For maximizing the solar active area of the fin, both front and back faces 152, 154 are preferably solar active. The preferred mounting system thus minimizes shading of the solar active area of the fin.

Support 101 comprises at least one structure including at least one above-ground portion, such as a building, grounded post, hanging fixture etc., providing an above ground mounting site which is exposed to the sun.

Figure 2:
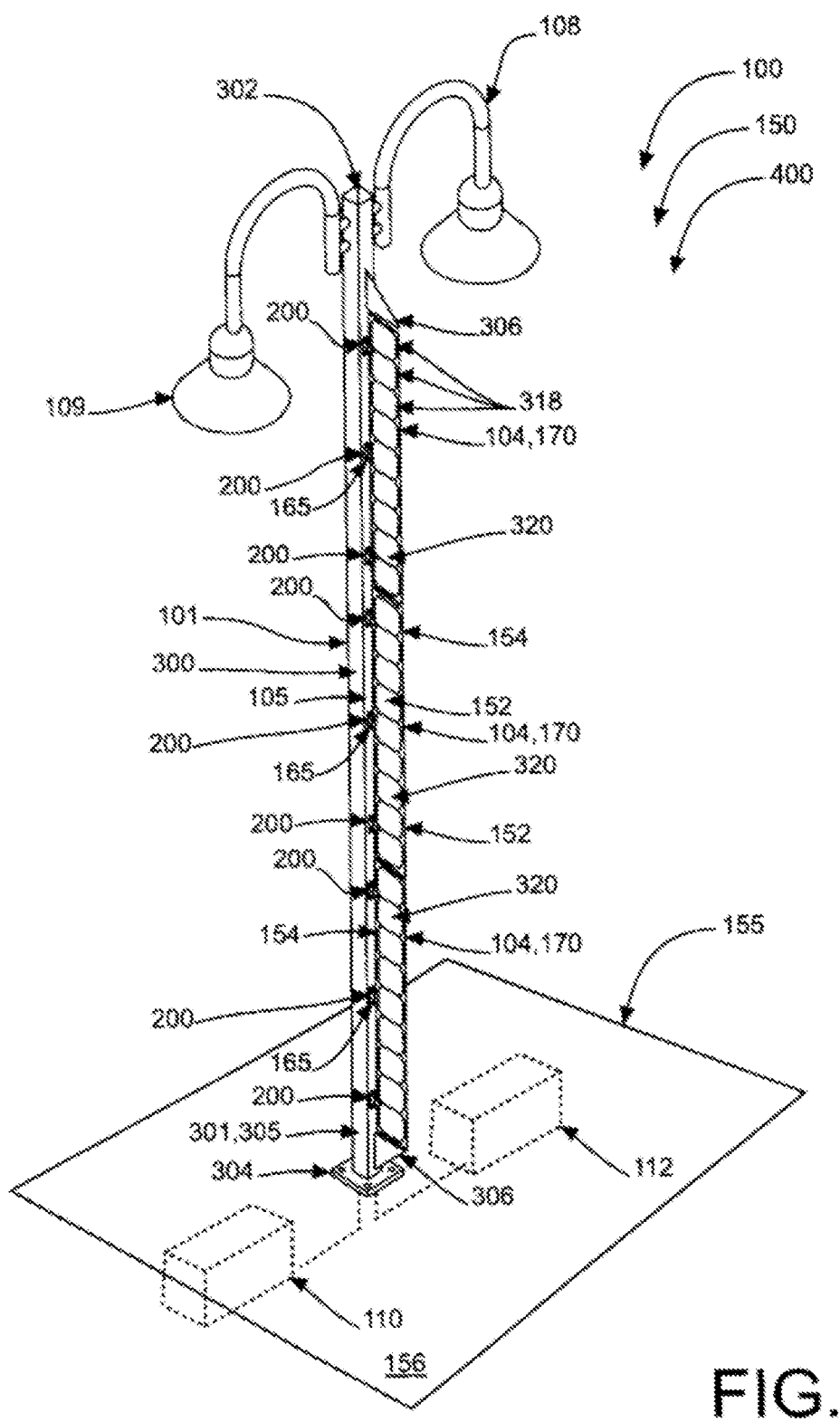
FIG. 2 is a perspective view of an improved solar energy system comprising a lighting fixture implementing a solar energy collector mounting assembly, in accordance with the embodiment of FIG. 1, utilizing a single support post arrangement.

According to one preferred embodiment, shown in FIGS. 1 and 2, support 101 comprises a single support structure 305, having opposite top and bottom ends, 302, 304, respectively, and a preferred planar surface 300 longitudinally parallel the single support's vertical axis 303 (see FIG. 1). Single support 305 is represented in FIG. 2 as a post 301 supporting a light source 109 (e.g. high efficiency LED or other luminaire), for a solar lighting system 400 including at least one site lighting fixture 108, and is illustrated generically in FIG. 1 as representing a structure such as a building, post (similar to post 301), or other similar structure. Single support 305 is preferably firmly anchored to a foundation such as ground 156 (see FIGS. 1 and 2), a sidewalk, rooftop, etc. at bottom end 304, with major axis 303 orthogonal to the foundations surface.

Surface 300 thereby provides a planar mounting site for mounting solar fin 104. According to one preferred embodiment, single support 305 embodied as post 301, is a square tube providing four longitudinal planar surfaces for conveniently mounting at least one solar fin 104. Preferably, a plurality of solar fins are mounted to single support 305, preferably in longitudinal alignment along axis 303, as shown in FIG. 2.

Upon reading this specification, those with ordinary skill in the art will now appreciate that, under appropriate circumstances, considering such issues as design preference, user preferences, applications, marketing preferences, cost, structural requirements, available materials, technological advances, etc., a plurality of solar fins may be mounted at various locations and relative arrangements on the support. For example, fins may be provided on multiple sides of the support, longitudinally staggered rather than aligned, etc.

An alternate embodiment, shown in FIGS. 3A and B, for an improved solar energy system 100 comprising solar lighting system 400 including a site lighting fixture 108, comprises a support 101 comprising a double post assembly 106 supporting light source 109, wherein preferably a plurality of solar fins 104 are held at their peripheral edges between the double post assembly. In this embodiment, the mounting assembly is integrated within double post assembly 106.

Upon reading this specification, those with ordinary skill in the art will now appreciate that, under appropriate circumstances, considering such issues as design preference, user preferences, applications, marketing preferences, cost, structural requirements, available materials, technological advances, etc., any type structure including an above ground exposed portion may provide a suitable support. Such suitable structure may include, for example, a building, gate, bridge, post of any configuration (e.g. cylindrical, any polygonal prism, solid, tube, etc.). Such a structure may be grounded, suspended, hinged, etc. Additionally, such a structure may provide a planar and/or essentially linear mounting surface (e.g. as with a cylindrical pole, corner of a building, corner of a window opening, etc.).

With particular reference to FIGS. 4A and B, and continuing reference to FIGS. 1-3, solar fin 104 preferably comprises at least one solar active cell 318, providing at least one solar active face 320. More preferably, solar cell 318 is a bifacial solar cell having photo-voltaic active regions on both the front and back sides, and providing first ("front") and second ("back") solar active faces 172, 173, respectively. Preferably, solar fin 104 is a two-sided glass substrate solar panel 170, preferably comprising glass-on-glass modules containing at least one, and preferably a plurality of bi facial cells, forming faces 152, 154, both of which are preferably solar active, and perimeter frame 105 of fin 104. Solar panel 170 is preferably rectangular, with vertical axis 160 being the panel's major axis.

Upon reading this specification, those with ordinary skill in the art will now appreciate that, under appropriate circumstances, considering such issues as design preference, user preferences, applications, energy generating requirements, typical ambient conditions, marketing preferences, cost, structural requirements, available materials, technological advances, etc., different types of solar panels of i.e. of varying dimensions, geometric configurations, cell types, etc., may suffice.

Preferably, solar fin 104 is mounted to support 101 with vertical axis 160 approximately orthogonal (preferably at about 0.degree.+−.10.degree. tilt, and more preferably at about 0.degree.+−.5.degree. tilt) to the surface 155 of the ground 156. In this preferred configuration, the fin's shading of itself (i.e. shading of faces 152, 154) is minimized.

Preferably, solar fin 104 is mounted to support 101 having a planar mounting surface (e.g. surface 300 of FIGS. 1 and 2), with horizontal axis 158 of fin 104 essentially orthogonal to surface 300 (i.e. faces 152, 154 are at right angle to surface 300). In this configuration, both faces are approximately at equal distance ("symmetrically equidistant") from the mounting surface. Equivalent to this, in embodiments where the mounting surface is essentially linear (i.e a cylindrical post, or corner of a building or of a polygonal post (e.g. corner edge 181 shown in FIG. 1), fin 104 may be mounted with horizontal axis 158 aligned with the internal radius or diagonal (e.g. diagonal 183 shown in FIG. 1) of the mounting site of the structure. This symmetrical equidistant alignment may be beneficial where the mounting surface would be large enough to cause significantly more shading on the underside of a horizontal tilt. This may further be beneficial for structural stability and aesthetics of symmetry, according to certain embodiments.

Upon reading this specification, those with ordinary skill in the art will now appreciate that, under appropriate circumstances, considering such issues as design preference, user preferences, applications, energy generating requirements, typical ambient conditions, marketing preferences, cost, structural requirements, available materials, technological advances, etc., other mounting orientations may suffice. For example, fin 104 may be mounted at the opening of a window to form a shade, wherein a user may adjust the position of the fin; additionally, although minimal tilting is preferred, tilting (i.e. greater than) 10.degree. with respect to the mounting surface may be desirable under certain circumstances.

Preferably, fin 104 is mounted at least one peripheral attachment site 165 of the fin which is at or near its perimeter frame 105. According to one preferred embodiment, peripheral attachment site 165 is on a single edge section 159 ("mounting edge section") of frame 105 (see FIG. 1). Preferably, fin 104 is mounted at a plurality of peripheral attachment sites on edge section 159, as shown in the figures. Mounting of fin 104 at peripheral attachment site 165 inhibits shading of faces 152, 154. Preferably, mounting edge section 159 is parallel vertical axis 160, which is preferably also the fin's major axis, i.e. the longer axis for a rectangular fin, (see FIG. 1). Preferably, mounting edge section 159 is linear, or at least partially linear, and is further preferably in line with the vertical axis of the support.

Preferably, fin 104 is capable of at least horizontal oscillation about a set mounting position with respect to support 101, in response to a displacing force, wherein the fin settles at its set position absent the displacing force. This is advantageous as it enables forces, e.g. wind, to be absorbed by the fin, preventing it from acting as a sail, thus lessening their possible destructive impact on the fin and/or support. This is especially advantageous for smaller and more vulnerable supporting structures such as poles.

Upon reading this specification, those with ordinary skill in the art will now appreciate that, under appropriate circumstances, considering such issues as design preference, user preferences, applications, marketing preferences, cost, structural requirements, available materials, technological advances, etc., embodiments not including oscillation capability may suffice, especially for stable structures such as buildings. Such embodiments may include, for example, a fin which is unmovably fixed at one position, or hinged, without a bias towards one set position.

With particular reference to FIGS. 4A-5B, a preferred mounting element 200 structured and arranged to attach fin 104 to support 101 having a planar surface 300, according to a preferred embodiment is described. Preferred mounting element 200 comprises at least one fin connector 204, and at least one support connector 206 coupled to fin connector 204.

Preferably, fin connector 204 comprises a holder 210 including congruent opposing brackets 212 with congruent opposing internal plates 214 defining a slot 211, sized to retain fin 104. Plates 214 preferably engage fin 104 on its opposite faces 152, 154, providing a peripheral attachment site 165 proximately adjacent edge section 159, as shown in FIG. 4B. Preferably, brackets 212 are provided with threaded apertures 228 for receiving a tightening screw or a screw and bolt assembly 229, preferably comprising at least two opposing pairs of tightening screws which are threaded through apertures 228 on brackets 212, and tightened to secure fin 104 in slot 211. Brackets 212 are preferably of equal dimensions comprising a vertical length 215 along vertical axis 218 of holder 210, and horizontal length 216 along horizontal axis 219 of holder 210, defining the area of slot 211. Fin 104 is held within slot 211, wherein plates 214 cover an area of faces 152, 154, adjacent attachment site 165. This configuration, though covering a small region of faces 152, 154, corresponding to the surface area of slot 211, still leaves the faces, and particularly their solar active regions, essentially uncovered. It is noteworthy to mention, as will be apparent to one skilled in the art, that in such an arrangement where the mounting element engages a small section of the faces, covering the solar active region may still be averted as the placement of solar cell(s) 318 may offset from edge 159 (as shown in FIGS. 4A and B) to provide an attachment site unoccupied by a solar active component. This preferred arrangement provides a mounting system which minimizes coverage of the solar active region of the fin by the mounting assembly.

Support connector 206, preferably comprises a mounting plate 220 including bores 222, preferably four corner bores, (see FIG. 4B) for bolting mounting element 200 via plate 220 to planar support surface 300, according to one embodiment. Plate 220 is preferably mainly comprised of a strong material such as metal. Vertical and horizontal axes 223, 224, respectively, define the plate's preferred orientation with respect to the vertical and horizontal axes 218, 219 of holder 210, wherein vertical axis 223 of the plate 220 is aligned with the vertical axis 218 of the clamp, which is aligned with vertical axis 160 of fin 104, as its mounted in the preferred "orthogonal-to-ground-surface" orientation, described above. As plate 220 is bolted parallel to planar mounting surface 300, faces 152, 154 will be approximately symmetrically equidistant from the mounting surface.

Preferably, mounting element 200 further comprises an oscillator 230 which is structured and arranged to enable oscillation of fin 104 about its set ("fixed") mounting position on support 101 in response to an external force, such as a wind force, against solar faces 152, 154, and to situate about its set position absent displacing forces. This reduces the impact of such a force, by enabling fin 104 to sway in order to absorb the impact.

Figure 5A:
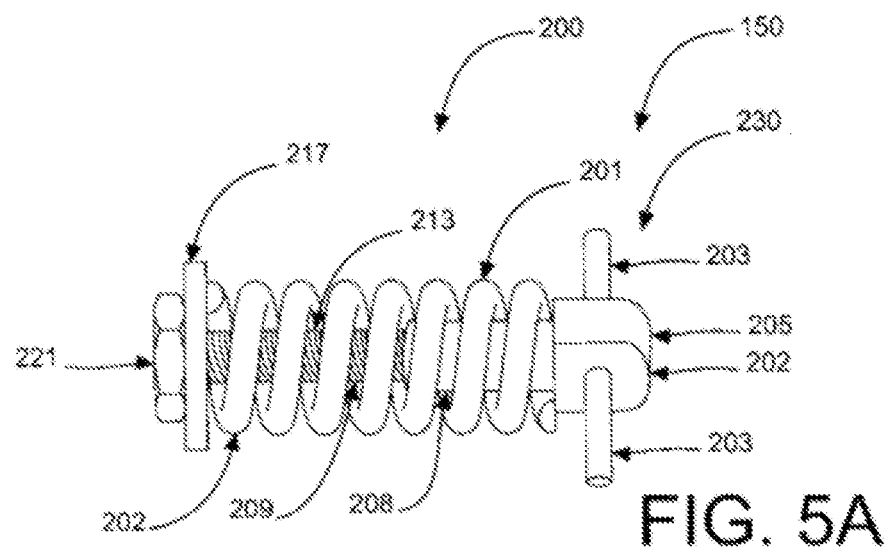
FIG. 5A is a perspective view of an oscillator for the mounting element of FIG. 4A, according to a preferred embodiment of the invention. The oscillator is illustrated separately from the fin connector and mounting plate.

According to a preferred embodiment, oscillator 230 comprises a hinge connector assembly 202 and a spring 201. Hinge connector assembly 202 preferably comprises a pivot pin 203, pivotally engaged through pivot pin retainer 205, a preferably inner threaded joint 208, extending from pin retainer 205, in threaded engagement with a screw 209, comprising external threading 213, and a screw head 221 supporting a washer 217, as shown in FIGS. 5A and B.

Figure 5B:
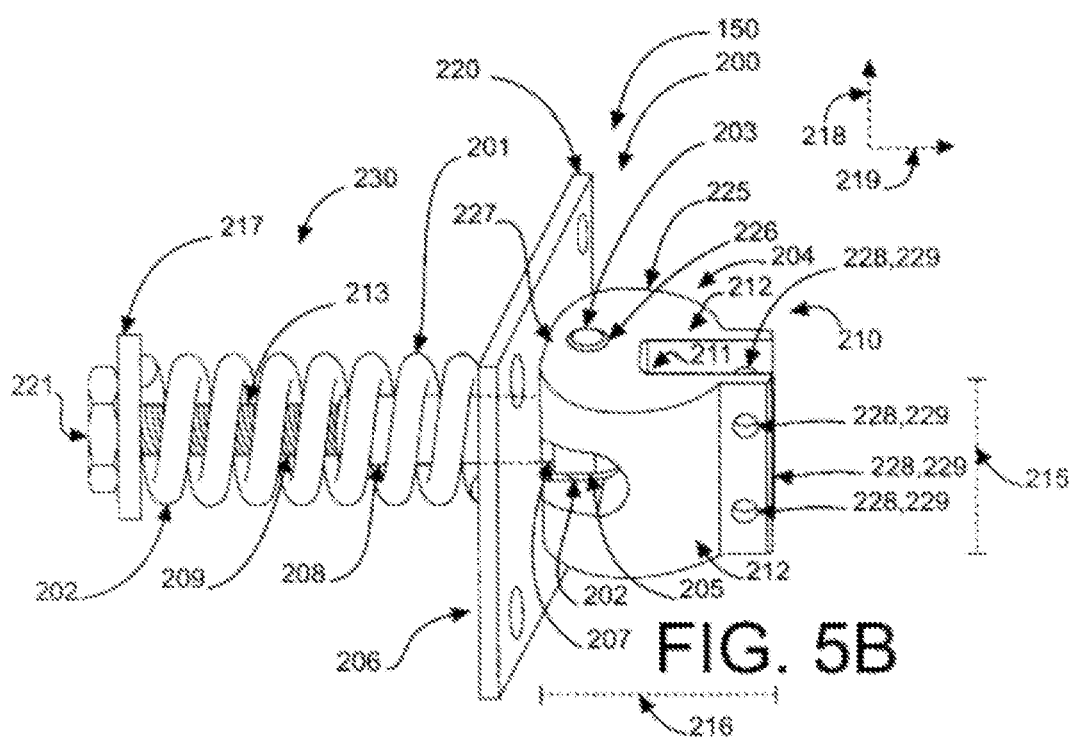
FIG. 5B is a perspective view of the oscillator, mounting plate and fin holder assembly shown separated from the solar fin.

As shown in FIG. 5B, hinge connector assembly 202 couples the mounting plate 220 and holder 210. Spring 201 is coiled around screw 209 and joint 208, and retained between washer 217 and mounting plate 220, as shown in the figure. Thus, the spring resistance can be adjusted by tightening and loosening screw 209.

Additionally, hinge connector assembly 202 enables holder 210 to pivot about axis 223 with respect to plate 220. Joint 208 of connector assembly 202 is slotted through a preferably central bore 207 provided on plate 220. Holder 210 is provided with a pin retaining slot 226 through which pivot pin 203 is preferably firmly retained. Thus, pivot pin retainer 205 allows holder 210 to oscillate on plate 220 about axis 223. Holder 210 preferably comprises rounded walls 225 extending from a flat base 227. Thus, when holder 210 is at its centralized (at rest or stabilized) mounting position, flat based 227 sits flush upon plate 220. A displacing force (i.e. against fin 104) causes holder 210 to pivot from its centralized position wherein rounded walls 225 allow for smooth rocking oscillation about mounting plate 220. The pivoting of holder 210 pulls hinge connector assembly 202 towards plate 220 compressing spring 201. Spring 201 provides a biasing force inclining holder 210 back to its centralized position.

Preferably, holder 210 and plate 220 are constructed of a metallic material. More preferably, holder 210 is comprised of aluminum, and plate 220 is comprised of steel. Also preferably, a smooth surface such as plastic (e.g. an additional plastic plate or an embedded plastic portion), may be provided between plate 220 and holder 210 to further reduce friction between walls 225 and plate 220.

Figure 6:
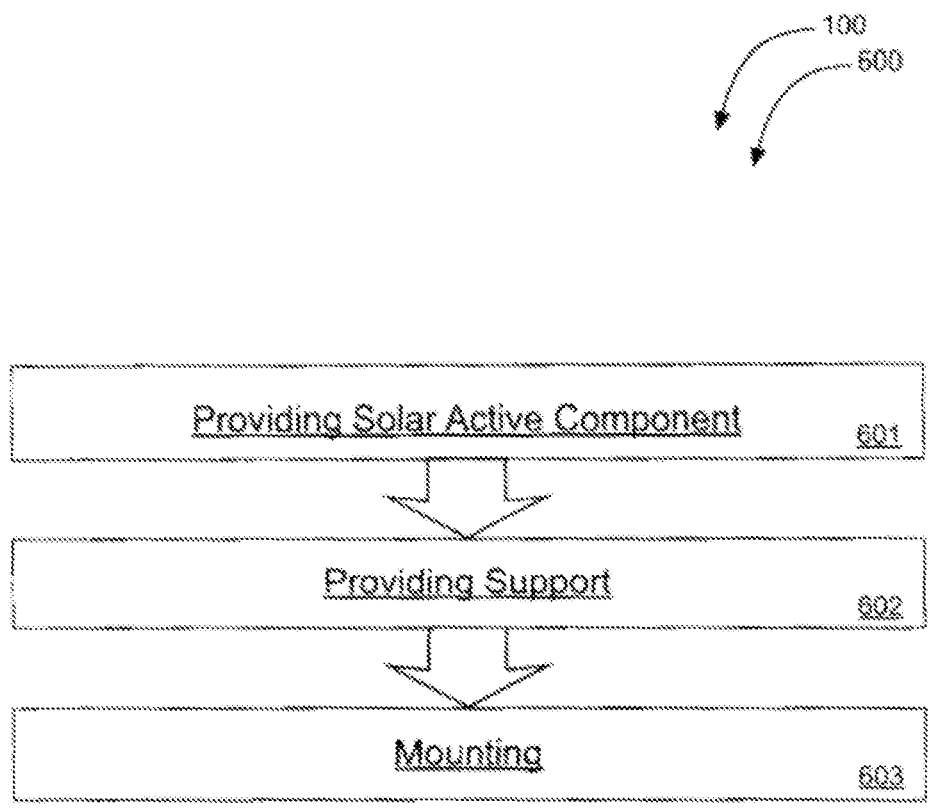
FIG. 6 is a flow charge, listing the preferred system steps for the system of FIG. 1.

With reference to the flow chart of FIG. 6, the above system is preferably implemented according to a method 600 comprising the following: a step 601 comprising providing at least one solar active component having a flat planar body; step 602 comprising providing at least one above ground support; and step 603 comprising mounting the solar active component to the support.

The solar active component of step 601 preferably comprises i) opposing first and second planar faces with ii) a perimeter frame surrounding the opposing planar faces, and iii) vertical and horizontal planar axes orthogonal one another, defining a the planar faces.

The above ground support of step 602 preferably comprises a mounting surface. Preferably the mounting surface of the support is defined by a vertical axis essentially orthogonal to the ground surface. The solar active component is preferably mounted (step 603) wherein i) its horizontal axis is orthogonal to the vertical axis of the mounting surface, and ii) at least a portion of its perimeter frame adjacent to the mounting surface.

Although the preferred arrangements have been described herein, upon reading this specification, those with ordinary skill in the art will now appreciate that, under appropriate circumstances, considering such issues as design preference, user preferences, applications, marketing preferences, cost, structural requirements, available materials, technological advances, etc., various types of panel mounting elements, including other types of fin connectors, and/or support connectors (e.g. screws on the edge of the fin, other types of hinge mounts, etc.), and/or oscillators (e.g. tension bands, pendulum-type mountings (e.g. a rod on which the fin is suspended), etc. may suffice. Additionally, mounting arrangements not requiring an external mounting element may suffice. For example the fin may be directly coupled to the support e.g. a retaining slot in the support (see FIG. 3) may hold the fin in place, etc. As such, the mounting element may be inherent in the fin, the support, or both. Additionally, one component may inherently be structured and arranged to provide a plurality of functions, e.g. fin connector and oscillator, or fin connector and support connector, etc.

With particular reference to FIGS. 2 and 4A, a preferred mounting assembly for a single post site lighting fixture 108 supporting a light source 109 for solar lighting system 400, will now be describe. Although this description is specifically directed to a site lighting fixture, one skilled in the art will readily understand that a similar version may be implemented in other applications incorporating improved solar energy system 100, described below.

Sight lighting fixture 108 includes at least one solar fin 104 comprising solar panel 170, including cells 318, mounted on single post 301. The preferred cells 318 of panel 170 are bifacial PV mono-crystalline silicon solar cells of an octagonal configuration, as shown in FIGS. 4A and B, and are commercially available through B-SOLAR LTD. Each panel 170 is a glass-on-glass module, weighing about 15 lbs., preferably comprising 9 cells. The preferred horizontal length 114 of panel 170 is less than about 12 inches, preferably less than 10 inches, and more preferably at about 6.7 inches. A preferred vertical length 116 of panel 170 is at about less than 60 inches, and more preferably at about 57.45 inches. Panel 170 further comprises a thickness of preferably less than 0.5 inches, and more preferably about 0.28 inches, with a preferred rounded corner radius of about 0.15 inches. Such panels are commercially available through PRISM SOLAR TECHNOLOGIES.

Preferably three of panel 170, comprising 18 cells in total, are mounted on single lighting post 301. (The typical production output achieved with the currently used cells in a sunny climate is approximately 90 Watts). The three panels are preferably stacked vertically along the length of post 301, as shown in FIG. 2. (Decorative features comprising triangular pieces 306, according to a preferred design, are included in FIG. 2). Although the panels are illustrated as stacked from bottom end 304, they may be offset at a higher point from the bottom (e.g. 5 ft above the ground in order to prevent small children from tampering with and possibly damaging the panels). Additionally, the number of panels is preferably increased or decreased as the length of the post is increased or decreased, respectively. This is advantageous as a higher post typically includes a higher light source which requires higher energy to provide the same illumination density as a lower source. The increased number of panels, which can be better accommodated by a higher post, can help fulfill this increased energy requirement.

Post 301 is preferably a 4.times.4 inch square tube steel post, preferably from 16-21 ft. in height such as an existing industry standard light post. Such existing posts may be provided with the above described solar panels, using preferred mounting element 200. Preferably, each panel 170 is mounted using three of mounting element 200, preferably positioned at a central mounting position 184, and top and bottom mounting positions 185, 186, respectively, equidistant from central mounting position 184, as shown in FIG. 4A. Each mounting element 200 preferably comprises a 3.times.3 inch steel plate of a preferred thickness of at least ⅛ of an inch and preferably ¼ inch. Holder 210 has a preferred vertical and horizontal lengths of approximately 1½ inches. The slot opening has a horizontal length of about ¾ inches, and an opening thickness slightly greater than the thickness of the panels (equal or less than approximately ½ inch). The screw of connector 202 preferably extends from 1½ to 1¾ inches from behind the mounting plate. To mount each panel, holes corresponding bores 222, are drilled on the surface 300 of the post, at desired mounting locations for bolting the plates to the post. An additional central bore is provided for connector 202.

Upon reading this specification, those with ordinary skill in the art will now appreciate that, under appropriate circumstances, considering such issues as design preference, user preferences, marketing preferences, cost, structural requirements, available materials, technological advances, etc., other system arrangements including diverse shapes, sizes, etc. may suffice.

According to one embodiment, site lighting fixture 108 comprises a stand-alone electrical power circuit, with power controller 110 for routing electricity, and solar storage battery 112 (see also FIG. 3). In this embodiment, lighting fixture 108 is entirely solar powered and independent of an external electrical power supply ("off-grid"). Battery 112 is depicted in the figure as an in ground enclosure, but may be located at any location on the fixture for storing solar derived electricity. According to one preferred embodiment, a battery pack including hardware may be installed inside the pole, rather than underground, for convenient retrofitting of an existing system.

An alternate preferred embodiment includes a solar powered hybrid, capable of switching between drawing power from battery 112, and an external electricity source, e.g. a power grid. Preferably, battery 112 would be configured to accommodate daily power requirements based on typical weather conditions, wherein grid power would be used on non-typical cloudy days ("bad weather days"). Thus, battery 112 would preferably be configured to store energy for about 10 hrs of usage in order to provide illumination during the nighttime. In the preferred embodiment, lighting fixture 108 would be retrofitted to include battery 112 in addition to its existing battery. Its existing battery would be powered from the grid to accommodate for bad weather days. Alternately, battery 112 could be supplied from the power grid as well as solar energy. This embodiment allows for a smaller battery 112 than the off-grid version. For the above described system 400, this would require a battery with a capacity which is roughly about five times smaller than the off-grid version in places of typically sunny climates (e.g. Phoenix, Ariz.). Additionally, this embodiment would allow for using grid power at times when the cost of electricity is lowest.

Solar powered lighting system 400 may include additional preferred features such as photocell detectors, motion sensors, weather sensors and predictors, etc., to control the timing and duration of lighting operation for saving power and improving operating efficiency.

A preferred embodiment may include providing a lower light source (e.g. 3 foot from the ground) on pole 301, in addition to light source 109 ("top light source") at the top of pole 301. The lower light source can be operated at lower power to provide a minimal level of illumination coverage (e.g. such as set by governmental codes for illuminating parking lots) when the area is unoccupied, while the higher light source may operate when a sensor indicates that the area is occupied.

Upon reading this specification, those with ordinary skill in the art will now appreciate that, under appropriate circumstances, considering such issues as design preference, user preferences, marketing preferences, cost, structural requirements, available materials, technological advances, etc., other system arrangements such as, for example, locating the batteries within the above-ground support structure, implementing wireless control features including a daisy-chain communication/control network, etc., may suffice.

Furthermore, upon reading this specification, those with ordinary skill in the art will now appreciate that, under appropriate circumstances, considering such issues as design preference, user preferences, marketing preferences, cost, structural requirements, available materials, technological advances, etc., other system arrangements such as, for example, signage applications, color-changing LED options, etc., may suffice.

Improved solar energy system 150, comprising the mounting assembly of the present invention may include, but is not limited to solar powered traffic lights, car and other vehicle charging stations, communication equipment, electrical billboards, surveillance systems, solar energy collectors (e.g. for public, private, and/or residential use), etc. Additionally, the improved solar system of the present invention may be implemented by retrofitting existing energy consuming devices or systems (solar or non-solar), according to the methods, and mounting assembly described herein.

Figure 7:
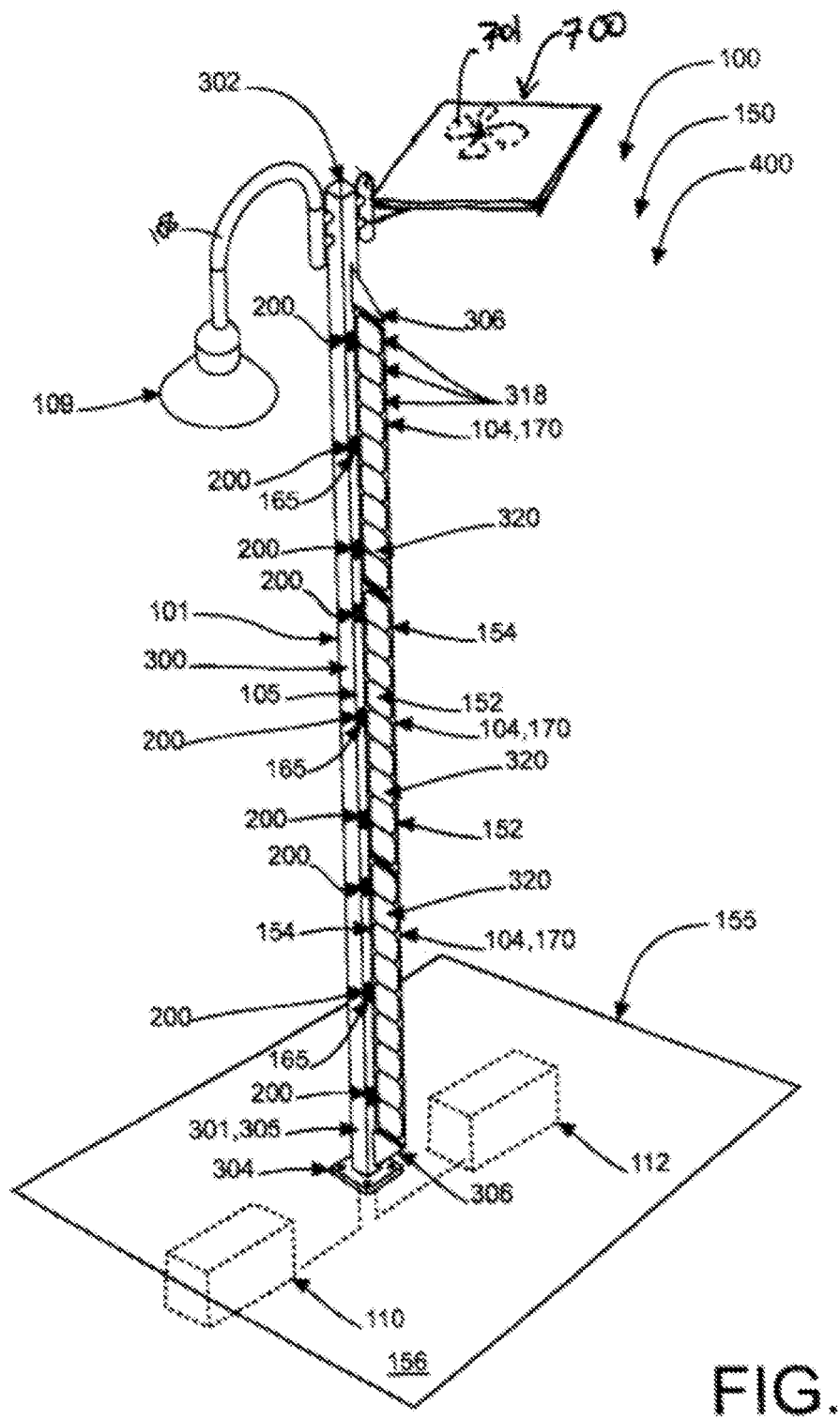
FIG. 7 illustrates a system 100, similar to the system of FIG. 2, which may be a modified parking lot light, comprising a drone docking station 700.

Further embodiments include a solar enabled drone charging station which utilizes a solar collector system such as the above described solar enabled light post and/or a grid interactive solar controller (see FIG. 7). Such charging stations may be of particular benefit with emerging drone technologies, and as drone use becomes more accepted, and prevalent for uses such as delivery mechanisms, etc. For example, standard parking lot lights may be modified to provide ideal landing targets for a drone system that is unencumbered at street level and allow for quick charging utilizing a street light solar panel (or similar solar collector) and control system. For example, FIG. 7 illustrates a system 100, similar to the system of FIG. 2, which may be a modified parking lot light, for example, comprising a drone docking station 700. Such a system may further support a light fixture, as shown in FIG. 7, or may solely support at least one docking station 700. Although FIG. 7 illustrates the docking station 700 supported above the solar collector system (i.e. fins 104) on post 301 the docking station 700 may be supported at any location. Such a system may further provide a radio frequency or light frequency "beacon system" which will announce its location to drones that may be in proximity of the light pole. This can be done on a localized method utilizing a predetermined frequency or a database based system with Geo-locations posted and updated to a database system and broadcast. Additionally, such a system may further include a docking station that will allow ease of connection between the drone and the host light post. Such docking station may have a physical means of receiving a mating appendage of the drone to both secure the drone to the station and allow access to the battery system of the drone. In various embodiments, the drone may include a camera system. Preferably, the above solar collector system will be utilized for such unmanned drone aircraft wherein a solar light post system preferably utilizing a grid-hybrid system, preferably containing both a solar panel system and a battery charging system, and preferably a processor in communication with a remote host. The host is preferably configured to clear a drone for landing, sequence a drone for fill up and take care of all of bookkeeping functions required to successfully complete a charging transaction with a docking drone. The onboard processor for the light pole is preferably also configured to sequence charging of the drone utilizing the localized battery, the solar panel or the Grid based onboard processor.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A drone charging station comprising:
   a post;
   at least one solar collector coupled to the post;
   a docking station, providing a landing target for a drone, the docking station coupled to the post, wherein the at least one solar collector is configured to charge a battery of the drone through solar power collected by the at least one solar collector wherein the solar collector and the docking station are both supported solely by the post, such that the post carries the entire weight of both the solar collector and docking station, and wherein the solar collector is a bi-facial solar active panel having front and back solar active faces.

2. The drone charging station of claim 1, wherein the post further supports an illumination source.

3. The drone charging station of claim 1, wherein the drone comprises a camera system.

4. The drone charging station of claim 1, further comprising a controller system configured to control landing, and charging of the drone.

5. The drone charging station of claim 4, wherein the controller system comprises a processor at the post, and a remote host in communication with the processor.

6. The drone charging station of claim 1, the charging station further comprising an alternate power source for charging the battery of the drone.

7. The drone charging station of claim 1, further comprising a storage battery configured to store power collected by the at least one solar collector, and charge the battery of the drone at the docking station.

8. The drone charging station of claim 1, the at least one solar collector having a flat planar body including i) a first planar face and a second planar face opposite the first planar face, ii) a perimeter frame surrounding the first and second planar faces; wherein the at least one solar collector is coupled to the post at a portion of the perimeter frame of the at least one solar collector wherein the at least one solar collector is coupled such that an axis parallel to its planar faces is also parallel to a major axis of the post.

9. The drone charging station of claim 1, wherein the docking station is above the at least one solar collector.

10. The drone charging station of claim 1, wherein the drone is used for delivery.

11. A drone charging station for a package delivery drone, comprising:
   a solar collector system comprising at least one solar panel;
   a docking station providing a landing target for the package delivery drone, wherein the solar collector system provides solar power collected at the charging station to charge a battery of the drone; and
   an illumination source,
   wherein the solar panel, docking station, and illumination source are coupled to and entirely supported by a single post.

12. The drone charging station of claim 11, wherein the solar collector serves as a sole power generating source for the drone charging station at the single post.

13. The drone charging station of claim 11, wherein the drone comprises a camera system.

14. The drone charging station of claim 11, further comprising a controller system configured to control landing, and charging of the drone.

15. The drone charging station of claim 14, wherein the controller system comprises a processor at the charging station, and a remote host in communication with the processor.

16. The drone charging station of claim 11, further comprising a storage battery configured to store power collected by the at least one solar collector, and charge the battery of the drone at the docking station.

17. The drone charging station of claim 11, the at least one solar collector having a flat planar body including i) a first planar face and a second planar face opposite the first planar face, ii) a perimeter frame surrounding the first and second planar faces; wherein the at least one solar collector is coupled to the post at a portion of the perimeter frame of the at least one solar collector wherein the first and second planar faces are both solar active and wherein the perimeter frame is in line with a major axis of the post.

18. The drone charging station of claim 11, wherein the single post is 16-21 ft high.

19. A drone charging station comprising:
   a post;
   at least one solar collector coupled to the post;
   a docking station, providing a landing target for a drone, the docking station coupled to the post, wherein the at least one solar collector is configured to charge a battery of the drone through solar power collected by the at least one solar collector wherein the solar collector is a bi-facial panel having front and back solar active faces.

20. The drone charging station of claim 19, further comprising an illumination source, wherein the post singly supports the docking station, and wherein the drone is a package delivery drone.

* * * * *